(12) United States Patent
Peltola et al.

(10) Patent No.: US 10,632,573 B2
(45) Date of Patent: Apr. 28, 2020

(54) WIND TURBINE BLADE AND RELATED METHOD OF MANUFACTURE

(75) Inventors: Esa Peltola, Vit (FI); Pauli Vuomajoki, Rovaniemi (FI); Tomas Wallenius, Vit (FI); Raimo Huuhtanen, Rovaniemi (FI)

(73) Assignee: WICETEC OY, Helsinki (FI)

( * ) Notice: Subject to any disclaimer, the term of this patent is extended or adjusted under 35 U.S.C. 154(b) by 657 days.

(21) Appl. No.: 14/122,695

(22) PCT Filed: May 30, 2012

(86) PCT No.: PCT/FI2012/050531
§ 371 (c)(1),
(2), (4) Date: Nov. 27, 2013

(87) PCT Pub. No.: WO2012/164167
PCT Pub. Date: Dec. 6, 2012

(65) Prior Publication Data
US 2014/0086748 A1 Mar. 27, 2014

(30) Foreign Application Priority Data
May 31, 2011 (FI) .................................. 20115536

(51) Int. Cl.
*F03D 1/06* (2006.01)
*B23P 15/04* (2006.01)
*F03D 80/40* (2016.01)

(52) U.S. Cl.
CPC ............ *B23P 15/04* (2013.01); *F03D 1/0675* (2013.01); *F03D 80/40* (2016.05);
(Continued)

(58) Field of Classification Search
CPC .......... F03D 80/40; F03D 80/00; F03D 80/60; F03D 1/003; F03D 1/0675; F03D 1/0683;
(Continued)

(56) References Cited

U.S. PATENT DOCUMENTS 2,496,279 A * 2/1950 Ely .................. B64D 15/12
139/425 R
2,590,944 A * 4/1952 Cowdrey ............... F24D 13/02
219/202
(Continued)

FOREIGN PATENT DOCUMENTS

FR 2528795 A1 12/1983
FR 2779314 A1 12/1999
(Continued)

*Primary Examiner* — David E Sosnowski
*Assistant Examiner* — Wayne A Lambert
(74) *Attorney, Agent, or Firm* — Mark M. Friedman

(57) ABSTRACT

A blade for a rotor of a wind turbine, said blade comprising a blade body element provided with a carrier surface to accommodate a heating element, an electrically conductive, elongated and substantially planar heating element disposed upon the carrier surface to extend longitudinally substantially along at least the leading edge of the blade preferably at least about 50% of the length of the blade, more preferably at least about 60% and most preferably at least about 70% respectively, an electrical power supplying conductor element located at one end of the heating element, the conductor element substantially extending over the width of the heating element on both sides thereof and electrically coupling thereto, and a joint structure comprising at least one electrically conductive joint element and substantially covering, on both sides of the heating element, the portions of the electrical conductor element that extend over the width of the heating element, wherein said blade preferably contains an instance of said electrical conductor element and joint structure substantially at both ends of the heating element. A corresponding method of manufacture is presented.

16 Claims, 3 Drawing Sheets

(52) U.S. Cl.
CPC ... *B32B 2260/046* (2013.01); *B32B 2262/101* (2013.01); *F05B 2280/2006* (2013.01); *Y02E 10/721* (2013.01); *Y02P 70/523* (2015.11); *Y10T 29/49337* (2015.01)

(58) Field of Classification Search
CPC ...... F05B 2280/2006; F05B 2280/2001; B23P 15/04; B64D 15/12; Y02P 70/523; B32B 2262/101; B32B 2260/046; Y02E 10/721; Y02E 10/722; Y10T 49/337; Y10T 49/49336
See application file for complete search history.

(56) References Cited

U.S. PATENT DOCUMENTS

| | | | | |
|---|---|---|---|---|
| 2,686,640 | A * | 8/1954 | Neel, Jr. | B64D 15/12 244/134 D |
| 2,743,890 | A * | 5/1956 | La Rue | B64D 15/12 219/202 |
| 2,884,509 | A * | 4/1959 | Heath | H05B 3/342 219/545 |
| 3,146,340 | A * | 8/1964 | Dewey, II | H05B 3/342 174/120 R |
| 3,178,560 | A * | 4/1965 | Mapp | A47L 1/16 219/528 |
| 3,349,359 | A * | 10/1967 | Morey | H05B 3/342 219/545 |
| 3,825,371 | A * | 7/1974 | Roder | B64C 27/473 244/134 D |
| 3,967,996 | A * | 7/1976 | Kamov | B23P 15/04 156/156 |
| 4,534,886 | A * | 8/1985 | Kraus | B29C 70/504 252/502 |
| 4,732,351 | A * | 3/1988 | Bird | B64D 15/163 244/134 D |
| 4,737,618 | A | 4/1988 | Barbier et al. | |
| 4,841,124 | A * | 6/1989 | Cox | B64D 15/12 219/201 |
| 4,888,472 | A * | 12/1989 | Stitz | H05B 3/36 219/528 |
| 4,942,078 | A * | 7/1990 | Newman | B32B 27/04 219/528 |
| 5,344,696 | A * | 9/1994 | Hastings | B32B 7/02 219/529 |
| 5,356,096 | A * | 10/1994 | Rauckhorst, III | B64D 15/166 244/134 A |
| 5,412,181 | A * | 5/1995 | Giamati | H05B 3/342 219/212 |
| 5,925,275 | A | 7/1999 | Lawson | |
| 5,934,617 | A * | 8/1999 | Rutherford | B64D 15/14 244/134 D |
| 5,947,418 | A * | 9/1999 | Bessiere | B64D 15/14 219/545 |
| 5,971,323 | A | 10/1999 | Rauch et al. | |
| 6,031,214 | A * | 2/2000 | Bost | B64D 15/12 219/202 |
| 6,137,083 | A * | 10/2000 | Bost | B64D 15/12 219/201 |
| 6,145,787 | A | 11/2000 | Rolls | |
| 6,237,874 | B1 * | 5/2001 | Rutherford | B64D 15/14 244/134 D |
| 6,279,856 | B1 * | 8/2001 | Rutherford | B64D 15/14 244/134 D |
| 6,338,455 | B1 | 1/2002 | Rauch et al. | |
| 6,483,087 | B2 * | 11/2002 | Gardner | B29C 70/82 219/529 |
| 7,157,663 | B1 * | 1/2007 | Kismarton | H05B 3/28 219/201 |
| 7,281,318 | B2 * | 10/2007 | Marshall | B29C 35/0272 174/117 FF |
| 7,291,815 | B2 * | 11/2007 | Hubert | B64D 15/12 219/529 |
| 7,585,156 | B2 * | 9/2009 | Oldroyd | B32B 5/024 416/230 |
| 8,952,296 | B2 * | 2/2015 | Hermann | B60H 1/2215 219/202 |
| 2008/0099617 | A1 * | 5/2008 | Gilmore | B64D 15/14 244/134 R |
| 2008/0181775 | A1 | 7/2008 | Livingston | |
| 2011/0280723 | A1 * | 11/2011 | Libergren | F03D 80/40 416/1 |
| 2012/0230830 | A1 * | 9/2012 | Lind | F03D 1/065 416/223 R |
| 2012/0298803 | A1 * | 11/2012 | English | B64D 15/12 244/134 D |
| 2013/0136598 | A1 * | 5/2013 | Loewe | F03D 11/0025 416/95 |

FOREIGN PATENT DOCUMENTS

| | | |
|---|---|---|
| GB | 724745 | 2/1955 |
| GB | 724745 A | 2/1955 |
| GB | 2121745 | 1/1984 |
| GB | 2121745 A | 1/1984 |
| WO | 2006/130454 A2 | 12/2006 |
| WO | 2006130454 | 12/2006 |
| WO | 2011018695 | 2/2011 |

* cited by examiner

WIND TURBINE BLADE AND RELATED METHOD OF MANUFACTURE

FIELD OF THE INVENTION

Generally the present invention pertains to wind turbines. In particular, the invention is related to icing prevention and icing reduction of wind turbine blades by heating.

BACKGROUND

Atmospheric icing takes place when water droplets in the atmosphere freeze on a contacted object. For example, in connection with aircrafts the ice may increase the risk of stalling of the airfoil. Thereby, the ice built-up should be detected as early and reliably as possible. For instance, an electromechanical probe with an oscillating (vibrating) sensing element may be provided on the nose of the aircraft, whereupon the ice accreted thereon causes changes in the oscillation frequency depending on the thickness of the ice layer. The oscillation frequency is monitored for estimating the amount of ice.

As another use scenario, the wind turbines of wind farms may be heavily affected by ice on the rotor blades. The blades may crack and the production efficiency may drastically decrease. The overall wear of the turbine may also increase due to mass and aerodynamic imbalances and resulting friction caused by the ice. Introduction of the aforesaid oscillating probe into the nacelle of a wind turbine has been suggested, so has been the use of various capacitance-, impedance-, and inductance-based detectors requiring the addition of specific sensors on the rotor blades. Further, different optical sensors monitoring the ice accumulated on a sensor surface based on e.g. changes on light reflection from the surface have been set forth.

To prevent or reduce icing, a number of anti-icing or de-icing procedures such as heating or microwave excitation procedures have been set forth to prevent, reduce or slow down ice accretion on predetermined surfaces. Heating may be implemented via blowing hot air or other gas, funneling heated wires, other elements or e.g. liquid, a liquid circulation system, to the target area(s). For anti-icing use the target areas may include ice-repellant coating such as silicon paint, for example.

Many known arrangements to prevent icing still suffer from reliability, efficiency and/or safety problems at least in certain type of operational conditions.

For instance, in the context of aviation and wind farms, the required heating capacity may be about 10 kW/m$^2$ in magnitude. If the connection between the target surface to be heated and the applied heating element is inadequate and fails, both the surface and the element may be damaged due to overheating.

In some scenarios, extremely thin metallic conductors such as wires or e.g. metallized fibers have been laminated in epoxy and provided onto the target surface. However, these arrangements are extremely prone to mechanical breakage due to fatigue caused by various potential factors such as repeated bending or moisture between the laminate layers, which easily leads to heating malfunction such as reduced or completely ceased heating without forgetting, on the other hand, the risk of overheating. In addition, the contemporary solutions may be extremely tricky to dispose on the target surface, such as rotor blade, without sacrificing some design requirements as to the thickness, weight, airfoil, etc. thereof.

SUMMARY OF THE INVENTION

Thereby, the objective is to alleviate one or more problems described hereinabove not yet satisfactorily addressed by the current heating arrangements, and to provide a feasible alternative for heating a target surface, such as the surface of a rotor blade, aeroplane wing, or some other vulnerable, ice-sensitive surface potentially still exposed to icing conditions.

The objective is achieved by the embodiments of a blade suitable for use with a rotor of a wind turbine and a related method of manufacture in accordance with the present invention.

Accordingly, in one aspect of the present invention a blade for a rotor of a wind turbine comprises

- a blade body element, optionally comprising glass fiber such as glass fiber reinforced composite material, comprising a carrier surface to accommodate a heating element,
- an electrically conductive, elongated and preferably planar heating element, preferably a carbon fiber-including element, such as a carbon fiber mat or the like, disposed upon the carrier surface to extend longitudinally substantially along at least the leading edge of the blade preferably at least about 50% of the length of the blade, more preferably at least about 60% and most preferably at least about 70% respectively,
- an electrical power supplying conductor element located at one end of the elongated heating element, conductor element substantially extending over the width of the heating element on both sides thereof and electrically coupling thereto, and
- a joint structure comprising at least one electrically conductive joint element and substantially covering, on both sides of the heating element, the portions of the electrical conductor element that extend over the width of the heating element.

Preferably there are at least two aforesaid conductor elements and optionally also joint structures, one of both at each end of the heating element to enable current flow through the element and related heating. Alternatively, conductor and/or joint structures with different configuration may be applied, e.g. at each end, in addition to the preferred conductor element and/or joint structure, respectively.

The joint element forming or being at least included in the joint structure may be a multi-portion element defining e.g. two layers, one for each side of the heating element. At least two of the portions may be connected together. The joint element may thus be a unitary element such as a 'u'-shaped element with two or more integral portions like the 'u'-halves, or multiple joint elements such as layers separated by intermediate material(s) may be utilized in the joint structure. A joint element or a plurality of them may further define at least four layers, two on each side of the heating element preferably conductor element portions in between. The joint element may be bent so as to extend along the both sides of the conductor element and/or the heating element.

In one embodiment, the heating element may indeed be substantially planar and bear e.g. substantially rectangular or elliptical shape. It may be a sheet or sheet-like. Additionally or alternatively, it may be a composite, or "aggregate", element comprising multiple portions located in series along the blade length and/or width. The portions may be electrically coupled together via conductors in between.

Yet, in perpendicular direction, the heating element may comprise multiple portions such as layers with potentially different characteristics such as materials and/or material ingredient orientation. The layers may have been laminated together. Preferably, a portion of the conductor element may extend between the layers. The heating element includes electrically conductive material such as suitable carbon fiber or graphite fiber.

In another, either supplementary or alternative, embodiment the heating element may be located closer to the tip than the root portion of the blade. In some embodiments, the heating element may be curved along the tip and substantially follow the shape thereof. For instance, the bent heating element may extend from the leading edge to the trailing edge and/or from the suction side to the pressure side of the blade.

In a further, either supplementary or alternative, embodiment the heating element may have at least one tapered end. The heating element may narrow towards the tip, for example.

In a further, either supplementary or alternative, embodiment the conductor element may be elongated or at least comprise an elongated portion. It may include a strip or wire, e.g. cylindrical string, configuration.

In some embodiments, the conductor element may include a split portion with a node and at least two branches to enable disposing the element on both sides (top/bottom) of the heating element. A branch may be located on one side and at least other branch on the opposite side. Additionally or alternatively, the element may include a plurality of separate sub-elements such as conductor wires that may be independently directed to either side of the heating element. The element may also include a cable or other aggregate structure that collectively hosts such as funnels and insulates a number of sub-elements such as stranded conductors outside the junction area with a common jacket, for instance.

In some other, supplementary or alternative, embodiments the conductor element, such as a single wire, may be bent so as to extend over the heating element on both sides thereof. A bend may include a substantially semi-circular bend or an acute fold, for example.

In a further supplementary or alternative embodiment, the conductor element may be both split and bent. For example, the element may comprise a node dividing into two branch portions that are then bent to reciprocate on either or both sides of the heating element.

Yet in a further supplementary or alternative embodiment, two or more elements of the blade may be constructed, connected, fixed and/or layered by lamination. Adhesive may be optionally applied.

Still in a further supplementary or alternative embodiment, the heating element may consist of or at least comprise a number of layers of optionally woven carbon-based material such as carbon fabric further optionally provided with filler material. Optionally, multi-axial such as bi-axial carbon fabric of multiple layers may be utilized.

In another aspect of the present invention, a method for constructing a blade for a rotor of a wind turbine, comprises
obtaining a blade body element comprising a carrier surface to accommodate a heating element, and
providing an electrically conductive, elongated and preferably planar heating element upon the carrier surface to extend longitudinally substantially along at least the leading edge of the blade preferably at least about 50% of the length of the blade, more preferably at least about 60% and most preferably at least about 70% respectively,
wherein electrical power supplying connection to the heating element is provided by a conductor element located at an end of the elongated heating element, the conductor element substantially extending over the width of the heating element on at least two sides thereof and electrically coupling thereto, and an electrically conducting joint structure comprising at least one electrically conductive joint element and substantially covering, on said sides of the heating element, the portions of the electrical conductor element that extend over the width of the heating element.

The various elements listed above may be joined together by lamination, for instance.

In an embodiment of the method, a further material layer is provided on top of the elements, said further material layer optionally including glass fiber. The further layer may provide insulation and/or protection to the underlying elements in addition to potential aesthetic effect. Also the airfoil of the blade may be optimized and thus the efficiency of the blade elevated therewith.

The previously presented considerations concerning the various embodiments of the arrangement may be flexibly applied to the embodiments of the method mutatis mutandis and vice versa, as being appreciated by a skilled person.

The utility of the present invention arises from a plurality of issues depending on each particular embodiment. First of all, the electrical coupling between the conductor and the heating element may be secured along the whole width of the heating element by the applied configuration of the conductor itself and the aforementioned joint structure, which elevates the heating efficiency, provides uniform heating and minimizes the risks of short cuts or contact breaks. Accordingly, the blade may be prevented from ice deposition thereon or the already-accreted ice may be melted and removed. A desired temperature of the blade may be achieved and maintained. Further, the suggested solution enables keeping the blade thin and light. Yet, manufacturing thereof remains relatively simple and fast.

The expression "a number of" refers herein to any positive integer starting from one (1), e.g. to one, two, or three.

The expression "a plurality of" refers herein to any positive integer starting from two (2), e.g. to two, three, or four.

Different embodiments of the present invention are disclosed in the dependent claims.

BRIEF DESCRIPTION OF THE RELATED DRAWINGS

Next the invention is described in more detail with reference to the appended drawings in which FIG. 1a illustrates a use scenario of an embodiment of the present invention in a wind turbine context.

DETAILED DESCRIPTION OF THE EMBODIMENTS

Figure 1A:
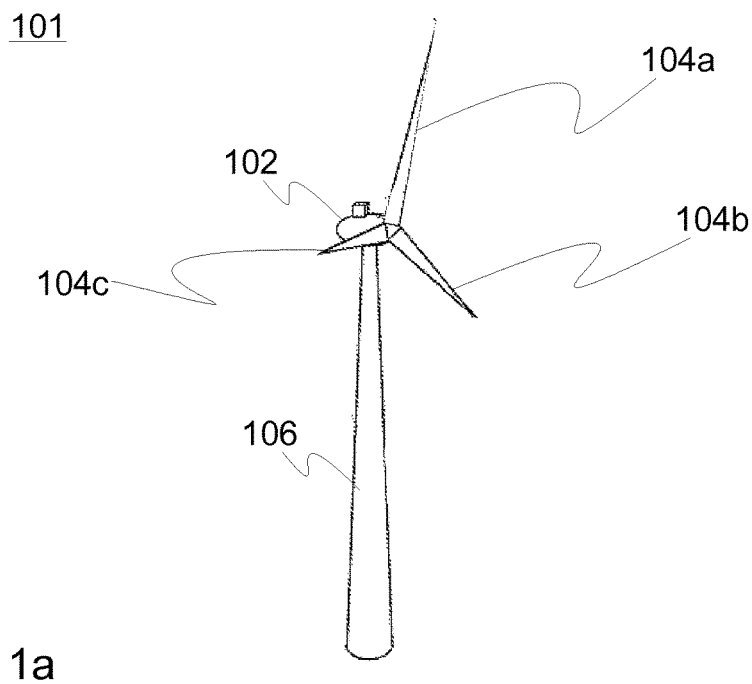
FIG. 1b illustrates different embodiments of the blade structure and related elements in accordance with the present invention.

FIG. 1a depicts a scenario wherein an embodiment of the present invention may be applied. A wind farm may include a number of wind turbines 101 each comprising a tower 106, a nacelle 102 and rotor hub with a number of blades 104a, 104b, and 104c. A blade 104a, 104b, 104c may substantially comprise a root portion with e.g. a cylindrically shaped cross section to connect the blade to the hub, and an airfoil portion with aerodynamically shaped cross section. The airfoil portion may comprise a suction side and a pressure side connected at the leading and trailing edges thereof.

Figure 1B:
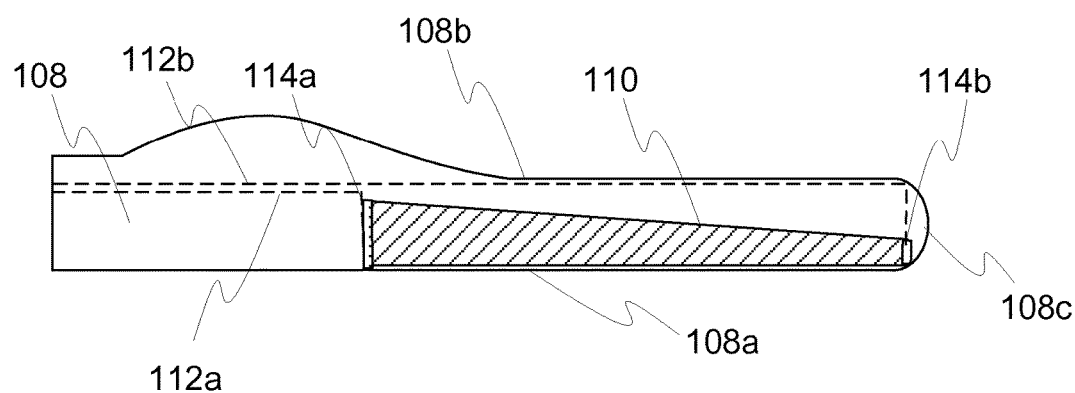
Figure 1B:
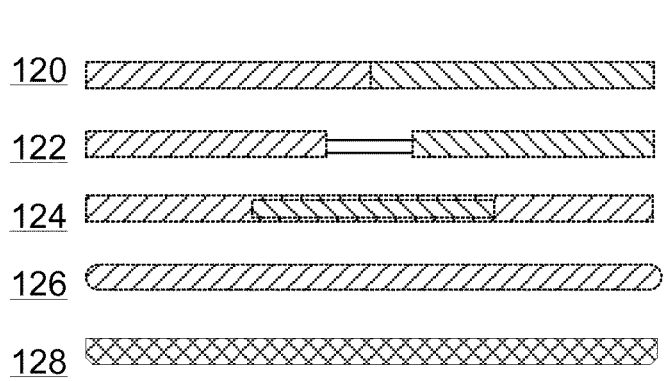
Figure 1B:
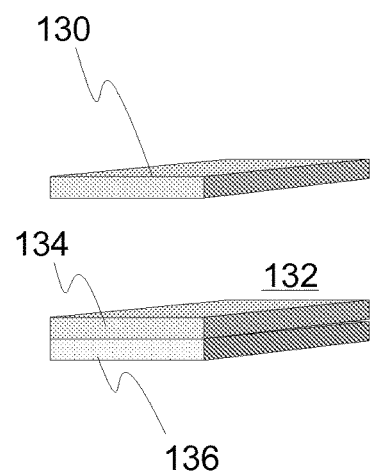

FIG. 1b illustrates different embodiments of the blade and associated elements. The blade 108, a merely exemplary cross-sectional sketch of which is shown in the figure, is provided with an elongated heating element 110 that may generally bear a planar, rectangular shape, for instance. Preferably the heating element 110 substantially extends at least along the leading edge 108a of the blade 108 over a distance that is at least 60% of the length of the blade 108 to provide even heating thereto. It is visible in the figure how only the minimal tip portion of the blade lack heating element in the illustrated embodiment. Preferably, the tip is thus heated by the suggested solution as well.

Preferably, the heating element 110 is located closer to the tip end 108c than the root end as the tip 108c may be more prone to icing. However, also symmetrical positioning or other alternatives may be applied depending on the embodiment.

In some embodiments such as in the depicted one, the heating element 110 has a tapered end. It may, in particular, narrow towards the tip 108c. Accordingly, heat dissipation near the tip 108c may be enhanced, which is preferred as the heat demand can be greater there due to increased convective cooling induced by higher local speeds. Less heating may be required at the root end.

Thereby, the heating element may advantageously cover the area of the blade that is responsible for most power generation. Namely, towards the root the contribution to the power generation may decrease and also the blade may become less prone to icing because of the geometric effect (airfoil is typically thicker) and aerodynamic effect (convective cooling is typically lower). Thus, the root end of the blade 108 may, in many scenarios, left unprotected or protected less effectively from icing.

The heating element 110 may be located closer to a desired predetermined side of the blade 108 surface, e.g. 'suction' surface or 'pressure' surface, in relation to the thickness of the blade 108. The surfaces may be flat, curved or segmented, for instance. Alternatively, the heating element 110 may be located symmetrically, e.g. into the centre of, relative to the two or more surfaces of the blade 108. As a further alternative, dedicated heating elements may be provided for multiple, such as suction and pressure, surfaces. Preferably, the heating element 110 is located closer to the leading edge 108a than the trailing edge 108b of the blade 108. Alternatively, the heating element may be located symmetrically, e.g. halfway, relative to the leading and trailing edges.

The heating element 110 may comprise fiber such as carbon fiber. It may include fiber-reinforced polymer, for instance, selected such that the desired heat and electrical conductivity figures are achieved.

The heating element 110 may be electrically connected to the power supply not shown in the figure via a number of electrical conductor elements 112a, 112b provided at least partially within the blade 108 and joints 114a, 114b preferably positioned at the ends of the elongated heating element 108 and more preferably also on both sides of the heating element, e.g. the side facing the viewer of the figure and the opposite side.

The end of the heating element may generally refer to a portion that preferably covers less than about 20%, more preferably less than about 10%, and most preferably less than about 5% of the overall length thereof.

At 120, an embodiment of the heating element is shown where the element comprises, in longitudinal direction, at least two different portions joined together. Alternatively or additionally, also in lateral direction (width) the element could comprise multiple joined portions. The portions may comprise different materials, material orientations and/or different dimensions. Accordingly, the properties of the portions, such as thermal and/or electrical conductivity, may mutually differ. At 122, an embodiment of the heating element comprises two portions preferably connected together by the electrical conductors. Alternatively, the portions could be connected independently to the power source or some intermediate element, for instance. At 124, an embodiment of the heating element comprises a material (central) portion embedded in the surrounding material. The embedded material may have different thermal and/or electrical conductivity than the surrounding material, for instance. At 126, an embodiment of the heating element comprises a curved, or generally tapered, end. At 128, an embodiment of the heating element comprises a tapered end having a contour shape defined by a piece-wise linear curve.

At 130, an embodiment of the heating element comprises a substantially planar material layer. At 132, an embodiment of the heating element comprises multiple overlapping such as stacked material layers 134, 136 relative to the element thickness.

Figure 2A:
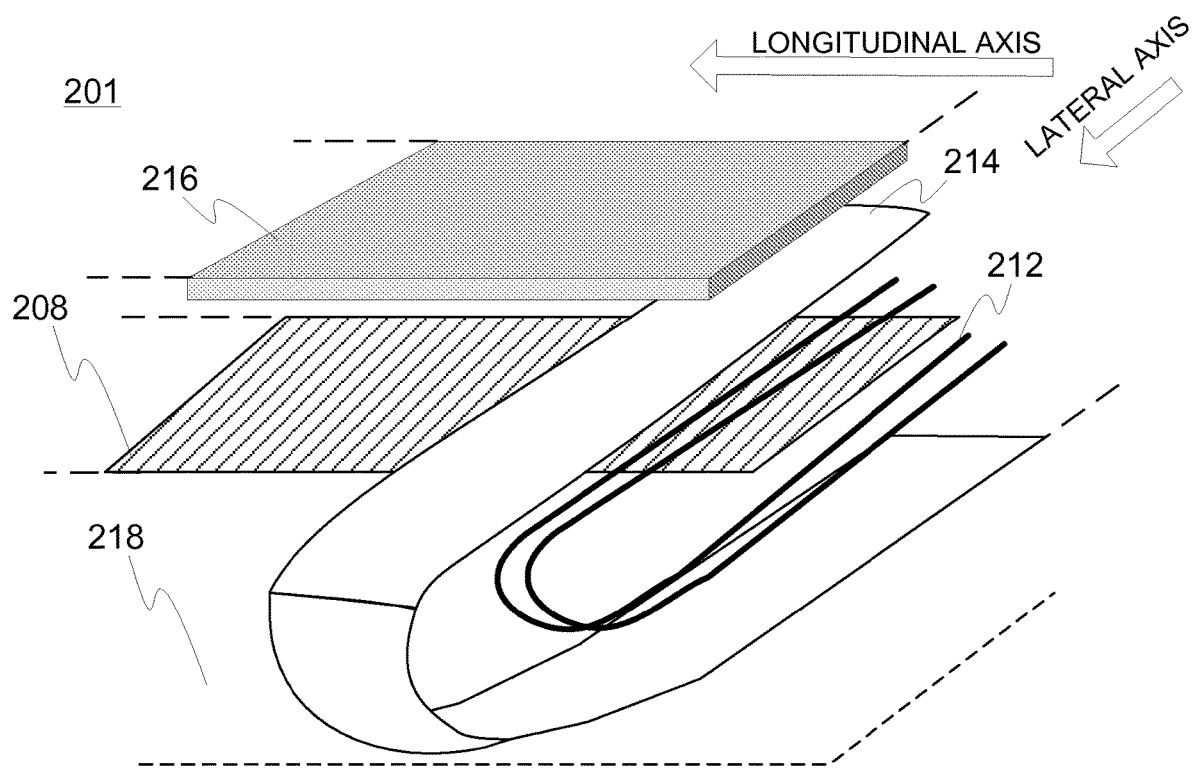
FIG. 2a illustrates an embodiment of the blade structure with particular emphasis on coupling between the electrical conductor element and the heating element at one end of the latter.

FIG. 2a illustrates, not in scale, an embodiment of the blade structure 201 and related electrical coupling to the power source. In the figure, only one end of the heating element 208 is shown. It is located on the blade body element 218 and the dotted lines depict the non-visualized part thereof extending to the direction of the associated longitudinal axis. A number of electrical conductor elements 212 may be situated along the both surfaces of the heating element 208 that is located in a predetermined position of the carrier material forming at least a part of the blade body 218. In the depicted scenario, two conductors have been bent around the element 208 to substantially form at least one turn to the end thereof in lateral (width) direction. The fold may be sharp, for example. The loop formed by the conductor element 212 may be closed comprising a node point, or it may be open (a hook-like). A joint element 214, such as a strip, has been bent so as to extend along both sides of the conductor element and the heating element. The joint element 214 has a u-shaped form in the figure for illustrating this fact. In real-life scenarios the bend may also be relatively sharp-cornered.

Alternatively, one or more joint elements 214 may comprise multiple, potentially at least initially separate, portions such as a top portion and bottom portion that may be independently positioned on each surface of the heating element 208 so as to cover the conductor 212 sandwiched in between. At least two ends of the portions may be configured to contact, optionally overlap, each other after the disposition.

A functional layer such as a protective and optionally airfoil-optimizing layer 216 has been provided on top of the constructed sandwich structure. The layer 216 may cover the whole blade 201 or just selected portions, such as the joint portions, thereof. Further functional and/or aesthetic layers may be provided thereon.

Figure 2B:
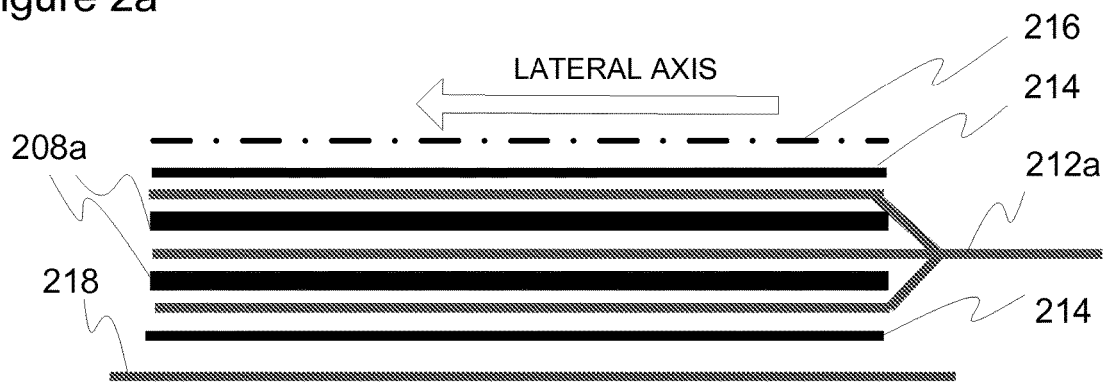
FIG. 2b illustrates a cross-section of another embodiment of the blade.

FIG. 2b illustrates a cross-section of another embodiment of the blade. The heating element 208a comprises a plurality of portions such as layers. It may comprise e.g. bi-axial carbon fabric. The shown conductor element 212a located at one end of the blade, such as tip end or root end, comprises a node splitting it into multiple, essentially three, branches. The middle branch extends between or within two portions, such as layers, of the heating element 208a. A branch may generally extend on one side and another branch on the opposite side of the heating element 208a or a portion such as a layer thereof. In the depicted case, joint elements 214 extend over the outmost branches of the conductor element 212a. These might alternatively bear joined ends (not shown in the figure) to form a unitary joint element with e.g. loop or u-shaped cross-section.

Figure 2C:
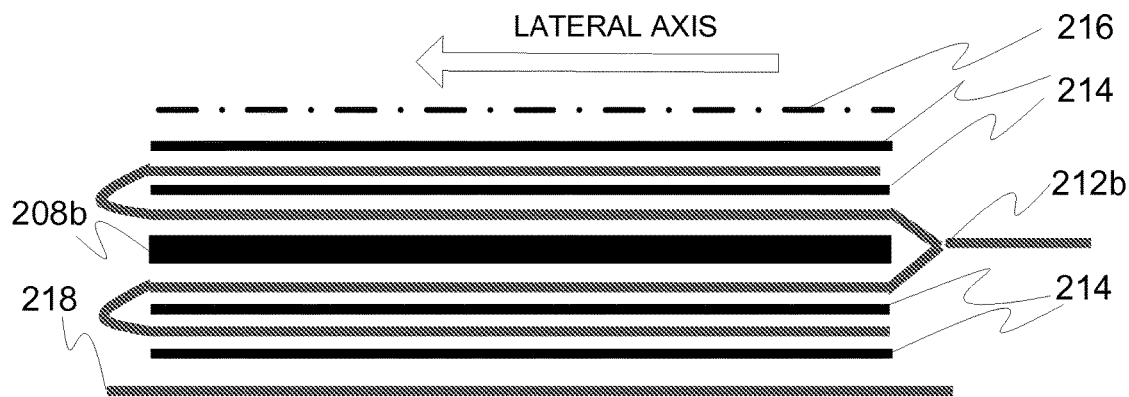
FIG. 2c illustrates a cross-section of a further embodiment of the blade.

FIG. 2c illustrates a cross-section of a further embodiment of the blade. The heating element 208b may be placed substantially in the middle of the stacked overall structure formed on the blade body element 218. The conductor element 212b includes a node dividing it into two branches. Each branch is directed to a dedicated side of the heating element 208b. Further, each branch is configured, such as bent, so as to extend over the width of the heating element 208b multiple, in the embodiment of the figure essentially two, times. At least one branch of the conductor element 212b could be joined back to the node (not shown in the figure) or other portion of the element to form a loop. A plurality of joint element layers 214, essentially two layers on both sides of the heating element 208b, have been provided. Portion of the conductor element 212b is configured to reside between the two layers 214 on each side. At least two joint element layers 214 might be mutually connected at the ends (not shown in the figure) to form e.g. a u-shape.

Figure 3:
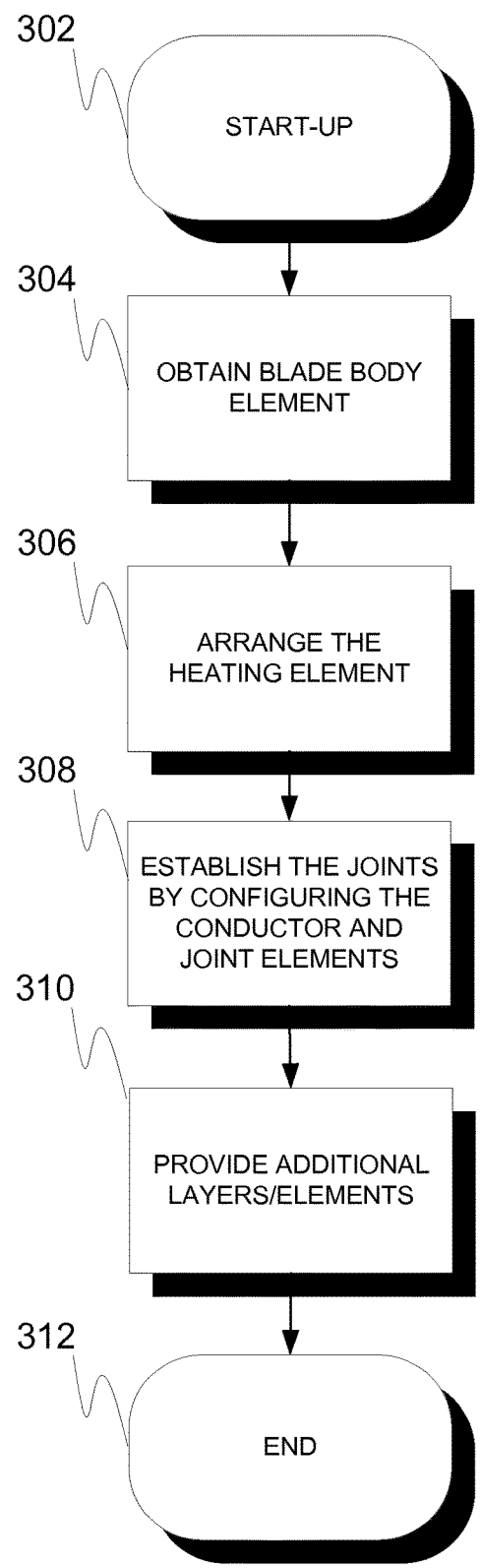
FIG. 3 is a flow diagram of an embodiment of a method in accordance with the present invention.

FIG. 3 discloses, by way of example only, a method flow diagram in accordance with an embodiment of the present invention. At 302, different start-up materials and elements may be manufactured, obtained and prepared. For instance, blade materials, power cables, signal cables, heating element materials, joint element materials etc. may be obtained and configured.

At 304, at least one blade body element is obtained. The blade body element may include glass fiber, for example, in particular e.g. glass fiber reinforced plastics such as polyester or epoxy. It may contain several pieces such as two halves that are to be joined together. The blade body element may resemble the final blade or e.g. blade half in size and/or shape. Likewise, multiple, such as two, body elements may be joined together to construct the basic shape of the blade. Different additional elements, such as signal cables, sensors and also electrical power cables applied for heating, may be provided and optionally fixed such as glued to the blade body element acting as a carrier thereto. Additional elements may be embedded in the body material.

At 306, at least one heating element is obtained and optionally positioned already at this stage to the blade body element. A strip of suitable material such as carbon fiber sheet may be cut and provided onto the blade body element, for instance. The heating element may be positioned so as to cover predetermined portion of a selected side of the blade body element corresponding to e.g. suction or pressure side of the finished blade. Optionally, the heating element may at least partially cover at least one edge of the blade body element such as the edge substantially forming or being at least parallel to the leading edge of the blade. Preferably, the heating element is positioned closer to the leading edge than the trailing edge unless e.g. more centered positioning is applied. Centering may be applied relative to the nose of the airfoil and/or between the leading and trailing edges, for example.

The heating element may, in some embodiments, extend longitudinally substantially along at least the leading edge of the blade preferably at least about 60% of the length of the blade, more preferably at least about 70% and most preferably at least about 80% or 90% respectively to advantageously provide tip-biased heating or even heating thereto. Alternatively, in some other embodiments with different use scenario and/or blade airfoil, for example, the extent of the heating element may be smaller.

The body element surface receiving the heating element may be first cleaned using e.g. acetone. Suitable resin may be provided on the body element and the heating element such as carbon fiber-including sheet may be then rolled or otherwise provided on top of it. The locations of the joints preferably at the ends of the heating element may be left loose at this stage to facilitate subsequent joint construction wherein conductor and joint element material are preferably configured to extend also between the body element and the heating element.

At 308, a number of electrical power supplying conductor elements, such as copper wires, are located preferably at the ends of the elongated heating element, the conductor element substantially extending over the width of the heating element on at least two sides thereof and electrically coupling thereto. The conductor elements may be fixed by suitable resin. The conductor elements are at least electrically coupled to the power source and may form the internals of power cabling installed at the blades, or be at least connected thereto. An electrically conducting joint structure incorporating a number of joint elements and substantially covering the portions of the electrical conductor element that extend over the width of the elongated heating element on both sides thereof is also provided. A plurality of joint elements may be initially provided and at least some of them be optionally connected together during the formation of the joints depending on the embodiment of the joint structure as contemplated hereinbefore.

In one embodiment, the ends of the heating element may have been initially left loose relative to the body element during item 306 as mentioned above so that joint and conductor elements may be now positioned between them. After the necessary layers of joint and conductor elements have been located between the body element and the heating element or at least the bottom layer of a multi-layer heating element, also the loose end of the heating element or at least the lowermost layer thereof may be fixed to the underlying aggregate structure of body, conductor and joint elements, and the remaining layers of the conductor, joint and optionally also the heating element (the end of which may be optionally bent over) may be provided on top. Suitable resin shall be applied in the procedure.

In alternative embodiment, the electrical joints may be formed in the heating element prior to positioning it to the final location upon the body element, i.e. a number of conductor elements and joint elements may be located first to the heating element after which the aggregate entity is located to the body element and fixed thereto.

The laminated areas may be hardened applying e.g. a vacuum bag inducing pressure and heating blanket inducing heat thereto. A suitable hardening time and temperature certainly depends on the embodiment and used materials and their amounts, but e.g. several hours and an elevated temperature of about 70 degrees centigrade may be necessary in some scenarios.

At 310, further layer(s) containing e.g. glass fiber may be provided to at least partially cover the body element/heating element/joint-aggregate. Preferably the protective glass fiber or alternative layer is disposed such as laminated on the heating element prior to curing the heating element. A number of sensors such as heat sensors may be connected to the structure with necessary wiring (if any as also wireless sensors may be applied). These actions may have been at least partially executed earlier in connection with item 306, for example, provided that the heating element has been positioned on the body element prior to finishing off the joints.

At 312, method execution is ended.

The mutual ordering and overall presence of the method items of the method diagrams disclosed above may be altered by a skilled person based on the requirements set by each particular use scenario. For example, a blade may include a plurality of heating elements to heat multiple sides (e.g. suction and pressure) and/or edges such as leading and trailing edges thereof. Optionally the heating elements of the different sides may even overlap at the leading edge.

Consequently, a skilled person may, on the basis of this disclosure and general knowledge, apply the provided teachings in order to implement the scope of the present invention as defined by the appended claims in each particular use case with necessary modifications, deletions, and additions, if any. For example, instead of a rotor blade for a wind turbine, the target surface to be heated could relate to a windmill, a wind pump, an airplane wing, a missile wing, etc. In many applications it is advantageous to provide the target object to be heated with at least one heating element as disclosed herein supplemented by an instance of the suggested electrical conductor element and joint structure substantially at both ends of the heating element. However, the conductor and/or joint arrangements could also differ between the ends. In some embodiments, a conductor/joint arrangement could be even located in the centre part remote from the end of the heating element.

The invention claimed is:

1. A wind turbine rotor blade comprising:
    a wind turbine rotor blade body element constructed from a glass fiber material, the blade body element comprising a carrier surface;
    a heating element accommodated by the carrier surface, the heating element being an electrically conductive, elongated and substantially planar heating element, the heating element disposed upon the carrier surface and having a first planar surface and an opposing planar surface extending longitudinally substantially along the length of at least a leading edge of the wind turbine rotor blade and having a width extending from said leading edge towards a trailing edge of the wind turbine rotor blade transversely to said length, said heating element extending between two ends thereof defined along said length, said two ends consisting of a first end mutually closer to a tip of the wind turbine rotor blade and a second end mutually closer to a root of the wind turbine rotor blade;
    an electrical power supplying conductor element including at least one conductor wire located on each of said two ends of the heating element, the electrical power supplying conductor element conveying electric current into the heating element and away from the heating element such that the electric current propagates within the heating element between said first and second ends, the at least one conductor wire of the electrical power supplying conductor element having at least a first portion and a second portion, the first portion contacting the heating element so as to cover a portion of said first planar surface extending along the entirety of the width of said first planar surface, and the second portion contacting the heating element so as to cover a portion of said opposing planar surface extending along the entirety of the width of said opposing planar surface, the width of said first planar surface and the width of said opposing planar surface of the heating element extending transversely to said length of the leading edge of the wind turbine rotor blade, and the electrical power supplying conductor element electrically coupling to the heating element via said first planar surface and said opposing planar surface; and
    a joint structure comprising at least one electrically conductive joint element that contacts and substantially covers, on both said first planar surface and said opposing planar surface of the heating element, the portions of the at least one conductor wire of the electrical power supplying conductor element that cover the width of the heating element.

2. The wind turbine rotor blade of claim 1, further comprising: at least one protective aerodynamically optimized layer disposed on the heating element and the joint structure, said at least one layer comprising glass fiber.

3. The wind turbine rotor blade of claim 1, wherein the heating element is located closer to the tip than the root of the wind turbine rotor blade.

4. The wind turbine rotor blade of claim 1, wherein the heating element has a tapered end, being the end located closer to the tip of the wind turbine rotor blade.

5. The wind turbine rotor blade of claim 1, wherein the heating element comprises multi-axial carbon fabric.

6. The wind turbine rotor blade of claim 1, wherein the heating element comprises carbon fiber or graphite fiber.

7. The wind turbine rotor blade of claim 1, wherein the heating element comprises a plurality of stacked layers.

8. The wind turbine rotor blade of claim 1, wherein the electrical power supplying conductor element is configured to bend so as to cover both said first planar surface and said opposing planar surface of the heating element.

9. The wind turbine rotor blade of claim 1, wherein the electrical power supplying conductor element comprises a node dividing the electrical power supplying conductor element into at least two branches directed to different sides of the heating element.

10. The wind turbine rotor blade of claim 1, wherein the electrical power supplying conductor element comprises at least two separate sub-elements directed to different sides of the heating element.

11. The wind turbine rotor blade of claim 1, wherein the electrical power supplying conductor element is configured to bend so as to repeatedly extend over a predetermined side of the heating element.

12. The wind turbine rotor blade of claim 1, wherein the heating element comprises two layers between which at least one portion of the electrical power supplying conductor element extends.

13. The wind turbine rotor blade of claim 1, wherein the joint structure includes a joint element bent so as to cover both said first planar surface and said opposing planar surface of the heating element.

14. The wind turbine rotor blade of claim 1, wherein the joint structure defines at least two layers, one on each of said first planar surface and said opposing planar surface of the heating element, and wherein portions of the electrical power supplying conductor element residing between them.

15. The wind turbine rotor blade of claim 1, wherein the joint structure includes a plurality of joint elements defining at least four layers, with two layers on each of said first planar surface and said opposing planar surface of the heating element such that a portion of the electrical power supplying conductor element extends between them.

16. A method for constructing a wind turbine rotor blade, the method comprising:
- obtaining a wind turbine rotor blade body element constructed from a glass fiber material and comprising a carrier surface;
- disposing a heating element on the carrier surface, the heating element being an electrically conductive heating element having a first planar surface and an opposing planar surface extending longitudinally substantially along the length of at least a leading edge of the wind turbine rotor blade and having a width extending from said leading edge towards a trailing edge of the wind turbine rotor blade transversely to said length, said heating element extending between two ends thereof defined along said length, wherein said two ends consist of a first end mutually closer to a tip of the wind turbine rotor blade and a second end mutually closer to a root of the wind turbine rotor blade;
- positioning an electrical power supplying conductor element that includes at least one conductor wire on each of said two ends of the heating element so as to contact the heating element such that a first portion of the at least one conductor wire of the electrical power supplying conductor element covers a portion of said first planar surface extending along the entirety of the width of said first planar surface, and such that a second portion of the at least one conductor wire of the electrical power supplying conductor element covers a portion of said opposing planar surface extending along the entirety of the width of said opposing planar surface, the widths of said first planar surface and said opposing planar surface of the heating element extending transversely to said length of the leading edge of the wind turbine rotor blade, so as to electrically couple the electrical power supplying conductor element to said first planar surface and said opposing planar surface such that electric current is conveyed by the electrical power supplying conductor element into the heating element and away from the heating element to propagate the electric current within the heating element between said first and second ends; and
- deploying an electrically conducting joint structure comprising at least one electrically conductive joint element to contact and substantially cover, on said first planar surface and said opposing planar surface of the heating element, the portions of the at least one conductor wire of the electrical power supplying conductor element that cover the width of the heating element.

\* \* \* \* \*